3,179,149
PNEUMATIC TIRES HAVING GOOD AIR
RETENTION CHARACTERISTICS
Bernard C. Barton, Kinnelon, Hendrik K. J. de Decker, Montclair, and Lewis Bsharah, Morris Plains, N.J., assignors to Texas-U.S. Chemical Company, Parsippany, N.J., a corporation of Delaware
Filed Feb. 20, 1963, Ser. No. 259,938
10 Claims. (Cl. 152—330)

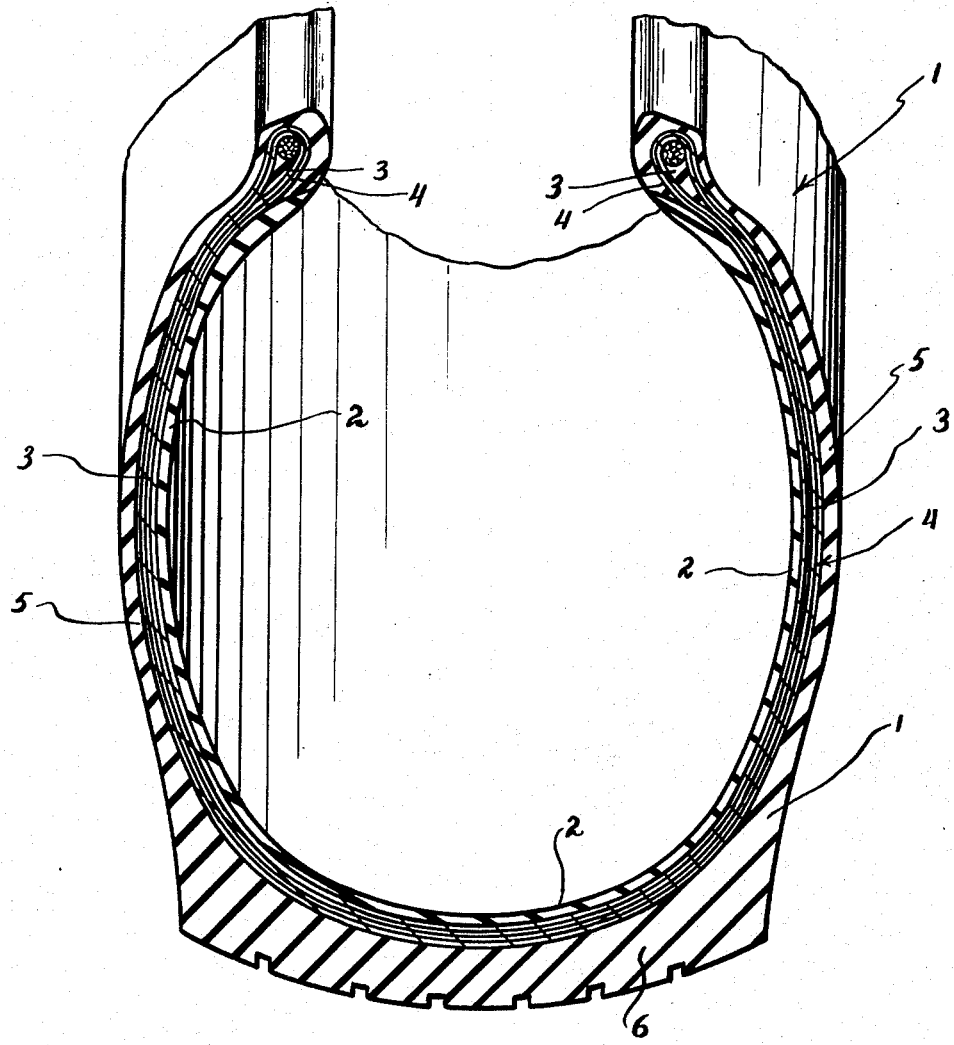

The present invention relates to an improved pneumatic tire.

Synthetic rubbers of the styrene-butadiene type, commonly referred to as SBR rubbers, have poor air retention characteristics, i.e., air diffuses into and through the rubber. This limits the use of these rubbers in the manufacture of tubeless pneumatic tires. Diffusion of air into the rubber also increases the degradation problem during forming and curing. These rubbers have otherwise desirable characteristics for tire manufacture and are more economical than the butyl rubber, often used for this purpose.

It is an object of this invention to provide pneumatic tires and particularly tubeless pneumatic tires, prepared from styrene-butadiene copolymers, which have good air retention characteristics.

FIGURE 1 is a cross-sectional view of a tubeless pneumatic tire according to the present invention.

We have discovered that pneumatic tires having the inner layer of the carcass prepared from a styrene-butadiene copolymer having admixed therewith a solid asphalt in an amount between 20 and 80 parts, and preferably between 35 and 55 parts, have good air retention characteristics. The air retention is sufficient to permit their use as tubeless tires.

The solid asphalt useful in admixture with the rubber for purposes of this invention is a solid residue of petroleum refinery operations, such as a bottom residue of crude petroleum oil distillation, essentially hydrocarbon in nature, having a wide molecular weight distribution ranging from molecular weights in excess of two million to weights of less than one thousand. Such asphalts are very hard materials below 0° C., and are solids at room temperature, but gradually soften as the temperature goes up, until they are readily pourable at 200° C. and up. The solid asphalts suitable for use in this invention should have a softening point of from about 70° F. to about 115° F., preferably 90° F. to 105° F., as measured by the standard ring and ball method (ASTM: D36–26). It is also important that the asphaltene content be low. The asphaltene content is defined as the fraction of the asphalt insoluble in n-pentane or 88° petroleum naphtha as determined by conventional methods. The flash point of the suitable asphalts (Cleveland Open Cup Method) is preferably within the range of from about 500° F. to about 575° F. The specific gravity of the solid asphalt is preferably about 1.00±0.02.

The asphalts are commonly designated soft, hard, etc., which broadly apply to materials classified as follows: very soft asphalt, softening point 70° F. and flash point 540° F.; soft asphalt, softening point 95° F. and flash point 505° F.; hard asphalt, softening point 104° F. and flash point between 500 and 575° F.; and very hard asphalt having a flash point of 480° minimum.

The rubbers having the improved air retention characteristics are butadiene-styrene copolymers containing from about 10% to about 60%, and preferably from about 20% to about 45%, bound styrene. The rubber employed may be of the unextended kind, or of the oil-extended kind. The improved styrene-butadiene rubber of this invention may be admixed with such compatible rubbers as natural rubber, polyisoprene, and polybutadiene, to produce rubber materials having the improved air retention characteristics. The mix may also contain other desired conventional compounding ingredients in conventional amounts including such materials as fillers, vulcanizing agents, accelerators, antiozonants, softeners or processing acids, plasticizers, etc. The rubber mix may be mixed in conventional mixing equipment such as internal mixers or open roll mills. The addition of the solid asphalt to the mix, is preferably made by adding asphalt in an emulsified state to a latex mix. The resultant mixture may then be coagulated, washed and dried in the normal manufacturing system, producing a solid asphalt-rubber crumb in an easily handled form. Alternatively, the solid asphalt may be mixed in the solid state with polymer in conventional mixing mills such as rubber mills or internal mixers such as Banbury mixers.

The carcass for the tubeless pneumatic tire may be assembled in accordance with conventional practice by superimposing any desired number of plies of rubberized tire cord fabric on a collapsible tire building drum. The assembly of the tire tread and carcass may be shaped and vulcanized in a mold under heat and pressure. The entire carcass 1 may be of styrene-butadiene rubber. The inner layer 2 of the carcass 1, is prepared from the solid asphalt-containing styrene-butadiene rubber. The inner layer 2 may be a separate liner which is made adherent to the inside wall of the tire carcass and becomes the inner layer 2 or inner wall 2 of the carcass. The remaining carcass may be prepared from styrene-butadiene, natural rubber, polyisoprene, etc., including the rubber layer 3 between and around the tire cords 4, the outer layer 5, and tread 6.

For the purpose of further understanding the invention to those skilled in the art the following illustrative examples are given.

In the examples, the air retention characteristics of styrene-butadiene rubbers are given. In each of the examples a rubber was prepared from a mix having 100 parts of the styrene-butadiene rubber copolymer, 50 parts of easy processing channel carbon black, 5 parts of zinc oxide, 1.5 parts of stearic acid, 2 parts of benzothiozolyl disulfide, and the specified amount of asphalt. The air retention measurements were made on a commercially available instrument, "Air Permeability Apparatus," Catalog No. 9–B302 and 9–B304, essentially a diffusion cell, manufactured by the American Instrument Company, Inc., Silver Spring, Maryland. This apparatus is described as an instrument designed to accurately measure the amount and/or rate of air or gas adsorption by various polymeric specimens. The rubber was mixed on a conventional rubber mixing machine and vulcanized into 6 x 6 x 0.030 in. slabs at a temperature of 292° F. for 50 minutes. Circular test pieces of 5-inch diameter were prepared from the vulcanized slabs. The test samples were inserted into the diffusion cell, constructed of two circular recessed stainless steel plates. The test is usually conducted at a regulated temperature of 30° C. with a constant pressure of 48 p.s.i. on one side of the rubber membrane and atmospheric pressure on the other. A manometer which permits readings to be made at atmospheric pressure is connected to the diffusion cell. The volume increase of air on the atmospheric side of the membrane is measured after a prescribed length of time. The air permeability is defined as the number of cubic feet of air at 32° F. and 29.92 inches of mercury diffusing through 0.001 inch thickness of polymer under a pressure differential of 1 pound per square inch per square foot of polymer per day.

| Example | Asphalt | | Styrene, Percent | Air Permeability × 10⁴ |
|---|---|---|---|---|
| | Type | Parts | | |
| 1 | Hard | | 23.5 | 15.5 |
| 2 | Hard | 50 | 44 | 4.7 |
| 3 | Hard | 25 | 44 | 5.6 |
| 4 | Very hard | 50 | 23.5 | 10.0 |
| 5 | Hard | 50 | 23.5 | 11.9 |
| 6 | Soft | 80 | 23.5 | 10.0 |

Tubeless pneumatic tires were prepared in which the liner rubber layer 2 was prepared from the solid asphalt-containing styrene-butadiene composition of Examples 2 and 3. These tires were tested and found to be satisfactory for commercial production and use.

The tire having the asphalt-containing inner layer has the advantage of protection from air degradation during forming and curing. The forming of the tire is accomplished by an inflation process with a steam or hot water inflated butyl bag which acts outwardly against the inner wall of the carcass. Without the air-retaining inner layer, entrapped air would diffuse under pressure through the tire carcass where ultimately it would cause degradation of the rubber and separation of the rubber layers.

As many embodiments of this invention may be made without departing from the spirit and scope thereof, it is to be understood that the invention includes all such modifications and variations as come within the scope of the appended claims.

What is claimed is:

1. A pneumatic tire having good air retention characteristics, having a carcass containing an inner layer of a rubber comprising, in admixture, (i) 100 parts by weight of a rubbery styrene-butadiene copolymer containing up to 60% by weight of styrene, and (ii) between 20 parts and 80 parts by weight of solid petroleum asphalt having a ring and ball softening point from 70° F. to 115° F.

2. A tubeless pneumatic tire having good air retention characteristics, having a carcass containing an inner layer of a rubber comprising, in admixture, (i) 100 parts by weight of a rubbery styrene-butadiene copolymer containing up to 60% by weight of styrene, and (ii) between 20 parts and 80 parts by weight of solid petroleum asphalt having a ring and ball softening point from 70° F. to 115° F.

3. The tire of claim 2 wherein the asphalt content of the styrene-butadiene layer is between 35 and 50 parts.

4. A tubeless pneumatic tire whose carcass has good air retention characteristics, said carcass containing an inner layer of rubber comprising, in admixture, (i) 100 parts by weight of a rubbery styrene-butadiene copolymer containing between 20% and 40% by weight of styrene, and (ii) between 20 parts and 80 parts by weight of solid petroleum asphalt having a ring and ball softening point from 70° F. to 115° F.

5. The tire of claim 6 wherein the asphalt is a soft asphalt having a ring and ball softening point of about 95° F.

6. The tire of claim 4 wherein the asphalt is an asphalt having a ring and ball softening point of about 104° F.

7. A tubeless tire whose carcass has good air retention characteristics, said carcass containing an inner layer of a rubber comprising, in admixture, (i) 100 parts by weight of a rubbery styrene-butadiene copolymer containing between 20% and 40% by weight of styrene, and (ii) between 35 parts and 50 parts by weight of solid petroleum asphalt having a ring and ball softening point from 70° F. to 115° F.

8. The tire of claim 7 wherein the asphalt is a soft asphalt having a ring and ball softening point of about 95° F.

9. The tire of claim 7 wherein the asphalt is an asphalt having a ring and ball softening point of about 104° F.

10. The tire of claim 7 wherein the asphalt has a ring and ball softening point of about 70° F.

References Cited by the Examiner

UNITED STATES PATENTS

| 2,582,264 | 1/52 | McMillan et al. | 260—28.5 |
| 2,905,220 | 9/59 | Schutz | 152—330 |
| 2,979,470 | 4/61 | Warren | 260—5 |

ARTHUR L. LA POINT, *Primary Examiner.*